United States Patent [19]

Urech et al.

[11] Patent Number: 4,908,273
[45] Date of Patent: Mar. 13, 1990

[54] MULTI-LAYER, HEAT-CURABLE ADHESIVE FILM

[75] Inventors: Karl Urech, Pratteln; Roland Moser, Basel, both of Switzerland

[73] Assignee: Ciba-Geigy Corporation, Ardsley, N.Y.

[21] Appl. No.: 167,764

[22] Filed: Mar. 14, 1988

[30] Foreign Application Priority Data

Mar. 24, 1987 [CH] Switzerland ................. 1118/87

[51] Int. Cl.$^4$ .................. B32B 27/06; B32B 27/38
[52] U.S. Cl. .................. 428/413; 156/330; 428/355; 525/438
[58] Field of Search ........... 428/413, 418, 416, 343, 428/355; 525/438; 156/330

[56] References Cited

U.S. PATENT DOCUMENTS

| | | | |
|---|---|---|---|
| 3,660,220 | 5/1972 | Groff | 428/413 X |
| 3,707,583 | 12/1972 | McKown | 525/119 X |
| 3,985,825 | 10/1976 | Schmid et al. | 525/438 |
| 4,073,827 | 2/1978 | Okasaka et al. | 428/413 X |
| 4,507,441 | 3/1985 | Goring | 525/438 |
| 4,704,331 | 11/1987 | Robins et al. | 428/413 X |
| 4,751,129 | 6/1988 | Ramalingam et al. | 428/413 X |

FOREIGN PATENT DOCUMENTS

| | | | |
|---|---|---|---|
| 0030479 | 3/1981 | Japan | 428/413 |
| 0207656 | 12/1982 | Japan . | |
| 0083031 | 5/1983 | Japan | 428/413 |
| 0083032 | 5/1983 | Japan | 428/413 |
| 0209556 | 12/1983 | Japan | 428/413 |
| 1182728 | 3/1970 | United Kingdom . | |

OTHER PUBLICATIONS

Amer. Chem. Soc. Org. Coat. Plast. Chem. Paper 35 (1975) No. 2, pp. 333-340.
Polymer Age, vol. 6 (56) No. 4, Apr. 1975, pp. 96-98.

*Primary Examiner*—George F. Lesmes
*Assistant Examiner*—J. Davis
*Attorney, Agent, or Firm*—Stephen V. O'Brien

[57] ABSTRACT

Multi-layer, heat-curable adhesive film having a tacky external curable layer A and a dry external curable layer B, containing various adducts which contain epoxide groups and are formed from an aromatic diglycidyl or polyglycidyl ether together with a carboxyl-terminated butadiene/acrylonitrile rubber and adducts of this type with a carboxyl-terminated polyester, and also aromatic diglycidyl or polyglycidyl ethers, varying amounts of fillers, dicyandiamide as a curing agent, a curing accelerator and, if appropriate, a carrier material between the layers A and B, is suitable for bonding various substrates and is preferably employed for bonding metal structural components without prior cleaning of these components.

10 Claims, No Drawings

MULTI-LAYER, HEAT-CURABLE ADHESIVE FILM

The present invention relates to a multi-layer, heat-curable adhesive film based on epoxide resins, and dicyandiamide as curing agent, containing a tacky external curable layer and a dry external curable layer, and to the use thereof for bonding structural components, in particular metal structural components which carry loads and have not been cleaned.

Adhesive films are already employed for the bonding of structural components instead of spot-welding folded seams or bonding by means of adhesive pastes. As is evident from Japanese Preliminary Published Application 57-207,656, not only improved handling, but also a more uniform distribution of the adhesive over the components or surfaces to be bonded is achieved by the use of adhesive films instead of adhesive pastes or powders. The Japanese Patent Application mentioned also discloses, inter alia, adhesive films based on conventional epoxide resins containing, in addition, carboxylic anhydrides as a curing agent.

The present invention relates to a multi-layer, heat-curable adhesive film having a tacky external curable layer A, containing
(a) 15 to 40% by weight of an adduct I containing epoxide groups and formed from an aromatic diglycidyl or polyglycidyl ether having an epoxide content of 3.5 to 6.5 equivalents/kg and a carboxyl-terminated butadiene/acrylonitrile rubber or a carboxyl-terminated polyester,
(b) 15 to 40% by weight of an adduct II containing epoxide groups and formed from an aromatic diglycidyl ether having an epoxide content of 0.3 to 3.0 equivalents/kg and a carboxyl-terminated butadiene/acrylonitrile rubber or a carboxyl-terminated polyester,
(c) 16 to 30% by weight of an aromatic diglycidyl or polyglycidyl ether having an epoxide content of 3.5 to 6.5 equivalents/kg,
(d) 0 to 6% by weight of an aromatic diglycidyl ether having an epoxide content of 0.3 to 3.0 equivalents/kg,
(e) 10 to 25% by weight of one or more customary fillers,
(f) 1 to 6% by weight of dicyandiamide,
(g) 0 to 2% by weight of a curing accelerator and, if appropriate,
(h) further customary additives, the components (a) to (h) adding up to 100% by weight,
a dry external curable layer B, containing
(a) 15 to 40% by weight of an adduct I containing epoxide groups,
(b) 15 to 40% by weight of an adduct II containing epoxide groups,
(c) 0 to 15% by weight of an aromatic diglycidyl or polyglycidyl ether having an epoxide content of 3.5 to 6.5 equivalents/kg,
(d) 0 to 6% by weight of an aromatic diglycidyl ether having an epoxide content of 0.3 to 3.0 equivalents/kg,
(e) 15 to 40% by weight of one or more customary fillers,
(f) 1 to 6% by weight of dicyandiamide,
(g) 0 to 2% by weight of a curing accelerator, and, if appropriate,
(h) further customary additives, the components (a) to (h) adding up to 100% by weight,
and, if appropriate, a carrier material between the layers A and B.

The layer A in the adhesive film according to the invention preferably contains
(a) 20 to 30% by weight of an adduct I containing epoxide groups,
(b) 20 to 30% by weight of an adduct II containing epoxide groups,
(c) 16 to 30% by weight of an aromatic diglycidyl or polyglycidyl ether having an epoxide content of 3.5 to 6.5 equivalents/kg,
(d) 0 to 6% by weight of an aromatic diglycidyl ether having an epoxide content of 0.3 to 3.0 equivalents/kg,
(e) 10 to 25% by weight of one or more customary fillers,
(f) 1 to 6% by weight of dicyandiamide,
(g) 0 to 2% by weight of a curing accelerator, and, if appropriate,
(h) further customary additives, the components (a) to (h) adding up to 100% by weight.

The layer B in the adhesive film according to the invention preferably contains
(a) 20 to 30% by weight of an adduct I containing epoxide groups,
(b) 20 to 30% by weight of an adduct II containing epoxide groups,
(c) 0 to 15% by weight of an aromatic diglycidyl or polyglycidyl ether having an epoxide content of 3.5 to 6.5 equivalents/kg,
(d) 0 to 6% by weight of an aromatic diglycidyl ether having an epoxide content of 0.3 to 3.0 equivalents/kg,
(e) 15 to 40% by weight of one or more customary fillers,
(f) 1 to 6% by weight of dicyandiamide,
(g) 0 to 2% by weight of a curing accelerator, and, if appropriate,
(h) further customary additives, the components (a) to (h) adding up to 100% by weight.

The adducts I and II containing epoxide groups and present in the adhesive film according to the invention as components (a) and (b) are known. For example, adducts containing epoxide groups and formed from epoxide resins and carboxyl-terminated butadiene/acrylonitrile rubber are described in German Offenlegungschrift 2,205,039, in Polymer Age, No. 6, April 1975, pages 96–98 and in Amer. Chem. Soc. Org. Coat. Plast. Chem. Pap. 35 (1975), No. 2, pages 333–340, and can be prepared by reacting an aromatic diglycidyl or polyglycidyl ether having an appropriate epoxide content at an elevated temperature with a carboxyl-terminated butadiene/acrylonitrile rubber in a ratio by weight of 90:10 to 70:30, preferably 85:15 to 75:25, if appropriate in the presence of a catalyst, such as triphenyl phosphite or bisphenol A.

Carboxyl-terminated butadiene/acrylonitrile rubbers are available commercially from the B. F. Goodrich company under the name of HYCAR and have the general formula

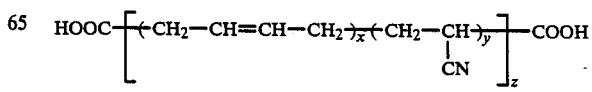

in which x is a number from 1–10, preferably 2–7, y is a number from 1–5, preferably 1–3, and z is a number from 1–30, preferably 5–15.

Adducts containing epoxide groups and formed from aromatic diglycidyl and polyglycidyl ethers and carboxyl-terminated polyesters are disclosed, for example, in German Offenlegungsschrift 1,770,032 and in German Offenlegungsschrift 2,459,447 and can be prepared by reacting aromatic diglycidyl or polyglycidyl ethers at an elevated temperature and, if appropriate, in the presence of a catalyst, in a ratio by weight of 90:10 to 70:30, preferably 85:15 to 75:25, with, for example, a polyester of the formulae I–III

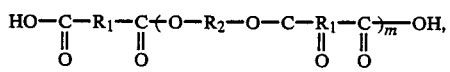

$$HO-\underset{\underset{O}{\|}}{C}-R_1-\underset{\underset{O}{\|}}{C}\!+\!O-R_2-O-\underset{\underset{O}{\|}}{C}-R_1-\underset{\underset{O}{\|}}{C}\!\!\rightarrow_{\!\!m}\!\!OH, \quad (I)$$

in which $R_1$ and $R_2$ are aliphatic radicals and m is a number such that the sum of the number of C atoms in $R_1$ and $R_2$ is at least 50,

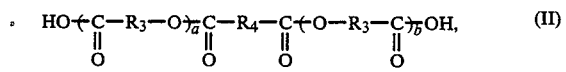

$$HO\!+\!\underset{\underset{O}{\|}}{C}-R_3-O\!\rightarrow_{\!\!a}\underset{\underset{O}{\|}}{C}-R_4-\underset{\underset{O}{\|}}{C}\!+\!O-R_3-\underset{\underset{O}{\|}}{C}\!\!\rightarrow_{\!\!b}\!\!OH, \quad (II)$$

in which $R_3$ is alkylene having at least 4 C atoms, $R_4$ is an aliphatic radical and a and b are numbers such that the sum of the number of C atoms in $R_3$ and $R_4$ is at least 50, or

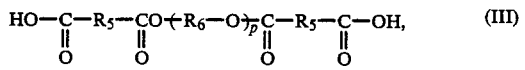

$$HO-\underset{\underset{O}{\|}}{C}-R_5-CO\!+\!R_6-O\!\rightarrow_{\!\!p}\underset{\underset{O}{\|}}{C}-R_5-\underset{\underset{O}{\|}}{C}-OH, \quad (III)$$

in which $R_5$ is an aliphatic radical, $R_6$ is alkylene having at least 5 C atoms and p is a number such that the sum of the number of C atoms in $R_6$ is at least 50.

In the polyester of the formula I the radical $R_1$ can be derived, for example, from the following aliphatic dicarboxylic acids: adipic acid, pimelic acid, suberic acid, azelaic acid, sebacic acid, nonanedicarboxylic acid, decanedicarboxylic acid, undecanedicarboxylic acid, dodecanedicarboxylic acid, allylsuccinic acid, dodecylsuccinic acid and dodecenylsuccinic acid. The following may be mentioned as examples of aliphatic diols from which the radical $R_2$ in the formula I can be derived: 1,4-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethylhexane and 1,6-dihydroxy-2,4,4-trimethylhexane.

The polyesters of the formula II are adducts of (a+b) moles of a lactone with 1 mole of an aliphatic dicarboxylic acid, for example the adducts of (a+b) moles of ε-caprolactone or exaltolide (the lactone of 15-hydroxyheptadecanoic acid) with 1 mole of maleic acid, succinic acid, adipic acid or sebacic acid.

The polyesters of formula III are condensation products obtained by esterifying 2 moles of an aliphatic dicarboxylic acid, such as maleic acid, succinic acid, adipic acid or sebacic acid, or 2 moles of a dicarboxylic anhydride, such as maleic anhydride, in each case with 1 mole of a polyglycol of the formula

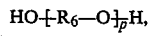

$$HO\!+\!R_6-O\!\rightarrow_{\!\!p}\!\!H,$$

in which $R_6$ and p are as defined in formula III.

Aromatic diglycidyl and polyglycidyl ethers which are used for the preparation of the adducts I and II containing epoxide groups and which are present, in addition, as the component (c) and, if appropriate the component (d) in the curable layers A and B of the adhesive film according to the invention are known compounds and are in some cases available commercially. The diglycidyl and polyglycidyl ethers can, for example, be prepared by reacting a compound containing at least two phenolic hydroxyl groups per molecule with epichlorohydrin under alkaline conditions or in the presence of an acid catalyst, with subsequent treatment with alkali. Depending on the amount of epichlorohydrin employed, low-molecular glycidyl ethers having a high epoxide content or high-molecular glycidyl ethers having a low epoxide content are obtained. Examples of compounds containing at least two phenolic hydroxyl groups are phenols, such as resorcinol or hydroquinone, and multinuclear phenols, such as bis-(4-hydroxyphenyl)-methane, 4,4-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane (bisphenol A) and 2,2-bis-(3,5-dibromo-4-hydroxyphenyl)-propane, and also novolaks formed from aldehydes, such as formaldehyde, acetaldehyde, chloral and furfural, with phenols, such as phenol itself and phenol substituted in the ring by chlorine atoms or alkyl groups having up to nine carbon atoms each, such as 4-chlorophenol, 2-methylphenol and 4-tert-butylphenol.

Examples of customary fillers (e) which can be present in the curable layer A and the curable layer B of the adhesive film according to the invention are bitumen, talc, chalk, wollastonite, mica, ground quartz, hydrated aluminium oxide, bentonite, kaolin, silica aerogel, metal powders, such as aluminium or iron powders, pigments or dyes, such as carbon black, oxide colours and titanium dioxide, or fire-retarding agents. The curable layers A and B preferably contain mineral fillers and carbon black.

The accelerators (g) employed are the customary accelerators which are known for the curing of epoxide resins with dicyandiamide, for example alkali metal alcoholates, tertiary amines, such as benzyldimethylamine, quaternary ammonium compounds, substituted urea, such as N-(4-chlorophenyl)-N,N-dimethylurea or N-(3-chloro-4-methylphenyl)-N,N'-dimethylurea, a Mannich base, such as 2,4,6-tris-(dimethylaminomethyl)-phenol, imidazole or imidazole derivatives, such as 2-methyl imidazole, 2-ethylimidazole, 2-ethyl-4-methylimidazole, 2-phenylimidazole or benzimidazole, and complexes of $BCl_3$ or $BF_3$ with tertiary amines, such as trimethylamine, piperidine, pyridine or hexamethylenetetramine. It is preferable to employ as the accelerator an imidazole, in particular 2-ethylimidazole, substituted ureas or $BF_3$ complexes with tertiary amines.

Examples of further customary additives (h) which can be present, if appropriate, in the heat-curable layer A and, if appropriate, in the heat-curable layer (b) of the adhesive films according to the invention are wetting agents, such as epoxysilanes, flow control agents, thixotropic agents, plasticizers, adhesion promoters, antioxidants, corrosion inhibitors, such as d-limonene, or light stabilizer. The content of further customary additives (h) is preferably up to 8% by weight, relative to the total weight of the components (a) to (h) in the heat-curable layer A or B.

The adhesive films according to the invention can consist of only one heat-curable layer A and one heat-curable layer B, but preferably contain a carrier material between the layer A and the layer B. The adhesive films according to the invention can also consist of a plurality of layers A and B.

Examples of suitable carrier materials for the adhesive films according to the invention are woven, knitted, nonwoven fibers or fibers arranged by means of a mechanical, thermal or chemical bond. These fibers can consist, for example, of polyvinyl chloride, polyacrylonitrile/acrylic acid ester copolymers, aromatic or aliphatic polyamides, aromatic or aliphatic polyesters, polyethylene, polypropylene, polystyrene, copolymers formed from styrene and ethylene or propylene, cellulose or glass. It is also possible to employ, as carrier materials, simple, textured or perforated films composed of thermoplastics, for example films provided with slits. If adhesive bonds of high peel strengths are to be achieved, the adhesive films according to the invention can contain, as the carrier material, films composed of rubber, for example styrene/butadiene rubber or acrylonitrile/butadiene rubber. It is preferable to use nonwoven carrier materials for the adhesive films.

The preparation of the adhesive films according to the invention is effected by known methods. It can be effected, for example, by applying the mixture of components for the component A in the form of an organic solution or as a melt by means of a doctor-knife to a separating layer which can be stripped off, such as separating films of polyethylene or polyester, or to silicone-treated separating paper. If a carrier material is used, it is placed on the layer A and the mixture of components for the layer B is then applied similarly to the uncoated side of the carrier material. If a carrier material is not used for the preparation of the adhesive films according to the invention, the layer B is applied directly to the layer A after the solvent has been evaporated or after the melt has cooled. If desired, a plurality of layers can be applied in an alternating arrangement in this manner.

The adhesive films according to the invention are suitable for bonding various substrates, such as ceramics, porcelain, glass, wood, plastics and metals, and are particularly suitable for bonding metals, such as aluminium, copper, iron or steel, especially structural components which carry loads and have not been cleaned.

The adhesive films according to the invention are distinguished by good contact adhesion to oily metal surfaces, so that previous cleaning processes on the structural components to be bonded become unnecessary. In addition, the adhesive films according to the invention are distinguished by easy foldability around edges and by a very good capacity for conforming to various contours within the temperature range from 10° to 30° C., and they are therefore suitable for application by means of automatic application systems, such as robot applicators.

The adhesive films according to the invention make it possible to seal folded seams so well that additional detailed sealing at the folded seams does not have to be carried out. In addition, the edges of the folded seams bonded with the adhesive films according to the invention can be coated completely in an electrophoretic coating bath, as a result of which improved protection against corrosion is achieved at the edges of the folded seams.

Curing of the adhesive bond is effected, in general, at temperatures between 80° and 200° C., preferably between 140° and 180° C., and, in the case of bonded metal structural components, can be carried out in the course of the normal painting process in the stoving oven.

EXAMPLE 1

An adhesive film having a tacky layer A and a dry layer B is prepared by using the following compositions:

| Composition of the layer | A [% by wt.] | B [% by wt.] |
| --- | --- | --- |
| Adduct, containing epoxide groups, formed from 73.8% by weight of a bisphenol A diglycidyl ether (epoxide content 5.2 to 5.4 equivalents/kg), 19.8% by weight of a carboxyl-terminated butadiene/acrylonitrile rubber (HYCAR ® CTBN 1300 × 13) and 0.6% by weight of bisphenol A | 26.50 | 26.50 |
| Adduct, containing epoxide groups, formed from 80% by weight of a bisphenol A diglycidyl ether (epoxide content 0.35–0.7 equivalents/kg), 19.4% by weight of a carboxyl-terminated butadiene/acrylonitrile rubber (HYCAR ® CTBN 1300 × 13) and 0.6% by weight of bisphenol A | 25.00 | 25.00 |
| Bisphenol A diglycidyl ether having an epoxide content of 5.1–5.4 equivalents/kg | 22.50 | 11.20 |
| Bisphenol A diglycidyl ether having an epoxide content of 0.35–0.7 equivalents/kg | 4.00 | 5.55 |
| Talc | 14.00 | 25.00 |
| Carbon black | 2.50 | 2.30 |
| γ-glycidyloxypropyltrimethoxysilane | 1.25 | 1.30 |
| Dicyandiamide | 3.25 | 2.41 |
| N—(3-Chloro-4-methyl phenyl)-N',N'-dimethylurea | 1.00 | 0.74 |

The epoxide compounds in the compositions indicated above are homogeneously mixed in a twin-trough kneader at 100° to 130° C. under vacuum. The talc and the carbon black are added successively and are also mixed in under vacuum, the temperature of the mixture being allowed to fall to 80° C. at the same time. The remaining components are then added individually and are homogeneously mixed in.

The compositions A and B thus prepared are applied to a silicone-treated separating paper as a coating by means of a doctor-knife coater at 80° to 90° C. in the following sequence:

1. 160 to 200 g/m$^2$ of composition A (side A)
2. a layer of polyester nonwoven of about 15 to 20 g/m$^2$
3. 220 to 260 g/m$^2$ of composition B (side B).

The adhesive film thus prepared has the following properties:

Thickness: 0.3–0.4 mm
Weight: 400–450 g/m$^2$
Side A is tacky at room temperature (RT) and has good adhesion to oily steel
Side B is dry at RT
Stability on storage at temperatures <10° C.: 1–2 months
Gel time at
   100° C.: <5 hours 140° C.: 20–30 minutes
180° C.: <5 minutes.

Steel sheets (steel 1403) which have been degreased and oiled with a 10% solution of "Pfinders P80" anti-corrosion oil in n-heptane are bonded with the adhesive film according to the invention and cured for 30 minutes at 180° C. The adhesive bond has the following properties:

Tensile shear strength as specified in DIN 53,283 on steel 1403
  degreased: 20 N/mm$^2$
  oiled: 18 N/mm$^2$
Roller peel strength as specified in DIN 53,289 on steel 1403
  oiled: 3–5 N/mm$^2$
Glass transition temperature: 80°–85° C.

EXAMPLE 2

A film adhesive is prepared analogously to Example 1 using equal amounts of adducts containing epoxide groups and now contain, instead of bisphenol A diglycidyl ether, equal amounts of a bisphenol F diglycidyl ether of the same epoxide content. The resulting film adhesive has the same properties as the film adhesive of Example 1.

What is claimed is:

1. A multi-layer, heat-curable adhesive film having a tacky external curable layer A, containing
   (a) 15 to 40% by weight of an adduct I containing epoxide groups and formed from an aromatic diglycidyl or polyglycidyl ether having an epoxide content of 3.5 to 6.5 equivalents/kg and a carboxyl-terminated butadiene/acrylonitrile rubber or a carboxyl-terminated polyester,
   (b) 15 to 40% by weight of an adduct II containing epoxide groups and formed from an aromatic diglycidyl ether having an epoxide content of 0.3 to 3.0 equivalents/kg and a carboxyl-terminated butadiene/acrylonitrile rubber or a carboxyl-terminated polyester,
   (c) 16 to 30% by weight of an aromatic diglycidyl or polyglycidyl ether having an epoxide content of 3.5 to 6.5 equivalents/kg,
   (d) 0 to 6% by weight of an aromatic diglycidyl ether having an epoxide content of 0.3 to 3.0 equivalents/kg,
   (e) 10 to 25% by weight of one or more customary fillers,
   (f) 1 to 6% by weight of dicyandiamide,
   (g) 0 to 2% by weight of a curing accelerator and,
   (h) further customary additives, the components (a) to (h) adding up to 100% by weight,
   a dry external curable layer B, containing
   (a) 15 to 40% by weight of an adduct I containing epoxide groups,
   (b) 15 to 40% by weight of an adduct II containing epoxide groups,
   (c) 0 to 15% by weight of an aromatic diglycidyl or polyglycidyl ether having an epoxide content of 3.5 to 6.5 equivalents/kg,
   (d) 0 to 6% by weight of an aromatic diglycidyl ether having an epoxide content of 0.3 to 3.0 equivalents/kg,
   (e) 15 to 40% by weight of one or more customary fillers,
   (f) 1 to 6% by weight of dicyandiamide,
   (g) 0 to 2% by weight of a curing accelerator, and,
   (h) further customary additives, the components (a) to (h) adding up to 100% by weight.

2. An adhesive film according to claim 1 having a layer A, containing
   (a) 20 to 30% by weight of an adduct I containing epoxide groups,
   (b) 20 to 30% by weight of an adduct II containing epoxide groups,
   (c) 16 to 30% by weight of an aromatic diglycidyl or polyglycidyl ether having an epoxide content of 3.5 to 6.5 equivalents/kg,
   (d) 0 to 6% by weight of an aromatic diglycidyl ether having an epoxide content of 0.3 to 3.0 equivalents/kg,
   (e) 10 to 25% by weight of one or more customary fillers,
   (f) 1 to 6% by weight of dicyandiamide,
   (g) 0 to 2% by weight of a curing accelerator, and,
   (h) further customary additives, the components (a) to (h) adding up to 100% by weight.

3. An adhesive film according to claim 1, having a layer B, containing
   (a) 20 to 30% by weight of an adduct I containing epoxide groups,
   (b) 20 to 30% by weight of an adduct II containing epoxide groups,
   (c) 0 to 15% by weight of an aromatic diglycidyl or polyglycidyl ether having an epoxide content of 3.5 to 6.5 equivalents/kg,
   (d) 0 to 6% by weight of an aromatic diglycidyl ether having an epoxide content of 0.3 to 3.0 equivalents/kg,
   (e) 15 to 40% by weight of one or more customary fillers,
   (f) 1 to 6% by weight of dicyandiamide,
   (g) 0 to 2% by weight of a curing accelerator, and,
   (h) further customary additives, the components (a) to (h) adding up to 100% by weight.

4. An adhesive film according to claim 1, consisting of a layer A and a layer B.

5. An adhesive film according to claim 1, containing a plurality of layers A and B in an alternating arrangement.

6. An adhesive film according to claim 1, containing a carrier material between the layer A and the layer B.

7. An adhesive film according to claim 6, containing a nonwoven as the carrier material.

8. A method for bonding structural components employing the adhesive film according to claim 1.

9. A method for bonding metallic structural components which have not been cleaned employing an adhesive film according to claim 1.

10. Structural components bonded with an adhesive film according to claim 1.

* * * * *